Patented July 27, 1943

2,325,489

UNITED STATES PATENT OFFICE 2,325,489

SILK-SOAKING COMPOSITION AND BATH

James T. Eaton, Wyncote, Pa., assignor to E. F. Houghton and Co., Philadelphia, Pa., a corporation of Pennsylvania No Drawing. Application January 30, 1941, Serial No. 376,709

14 Claims. (Cl. 252—8.7)

The present invention relates to a novel conditioning agent for silk, and to a novel silk-soaking bath, and more particularly it relates to a novel silk-soaking composition, far more efficient than those presently available.

The use of sulphonated fatty oils, such as sulphonated olive oil, sulphonated corn oil, sulphonated neat's-foot oil, and the like, as conditioning oils for silk has long been known to the art. In recent years, emulsifiable mineral oils have also been used for this purpose, either alone or in admixture with emulsifiable fatty oils. While these materials have found wide use in the industry, they are not as efficient in conditioning silk for knitting, weaving, and the like, as is desired. Furthermore, while attempts have been made to develop a silk-soaking composition which will permit the knitting of silk yarn in a dry condition, the materials suggested for use have not satisfactorily functioned.

The principal object of the present invention is to provide a composition markedly more efficient as a conditioning agent for silk gum than the materials now in use in the silk-soaking industry.

A further object of the present invention is to furnish a silk-soaking composition which will condition the silk so that dry knitting of the treated silk yarn may be successfully accomplished.

Other objects, including the provision of a novel silk-soaking bath, will be apparent from a consideration of the specification and claims.

The silk conditioning agent of the present invention comprises a mixture of a water-soluble salt of a sulphonated aliphatic monohydric alcohol-fatty acid ester of the type hereinafter set forth, and an organic plasticizing ester insoluble in water or having low water-solubility, i. e., an ester formed by reacting an organic hydroxy compound with a mono- or poly-basic organic acid, or with a poly-basic inorganic acid as will appear hereinafter.

The term "water-soluble salt" as used herein is defined as the ammonium, substituted ammonium, potassium, and sodium salts of the sulphonated reaction product of the aliphatic monohydric alcohol and the unsaturated aliphatic fatty acid. The aliphatic monohydric alcohol may contain from 1 to 10 carbon atoms, and the unsaturated aliphatic fatty acid may contain from 10 to 18 carbon atoms. The ratio of carbon atoms to ethylenic linkages, or double bonds, in the ester prior to sulphonation may vary between 12 to 1 and 28 to 1, preferably between 15 to 1 and 25 to 1. The term "unsaturated aliphatic acid" includes the unsaturated hydroxy acids. The water-soluble salt of the sulphonated monohydric alcohol-fatty acid ester may be represented by the formula (RCOOR') (—SO$_3$M)$_y$, where R' represents the group furnished by the aliphatic monohydric alcohol and may contain from 1 to 10 carbon atoms, preferably 4 to 5 carbon atoms; where R represents the group furnished by the aliphatic unsaturated fatty acid and may contain from 9 to 17 carbon atoms, there being in the group (RCOOR') a ratio of carbon atoms to ethylenic linkages, prior to sulphonation, of between 12 to 1 and 28 to 1; where M represents sodium, potassium, ammonium, or substituted ammonium ions or groups; and where y equals 1 or a fraction thereof greater than ⅕th. The fatty acid is preferably oleic or ricinoleic acid.

Any standard method of sulphonating the aliphatic monohydric alcohol-fatty acid ester may be employed. In a typical case, 1,000 pounds of the ester is sulphonated with 250 to 1,000 pounds of 66° Baumé sulphuric acid at a temperature of 10° C. to 20° C. The sulphonation mix is washed with 2,000 pounds of 10 per cent. brine solution at 10° C. to 25° C., and after drawing off the separated brine layer, the oil is neutralized with the alkaline material to form the salt desired.

Examples of the aforesaid water-soluble salts of the sulphonated aliphatic monohydric alcohol-fatty acid ester which may be employed in accordance with the invention are the said salts of sulphonated ethyl ricinoleate, sulphonated amyl oleate, sulphonated octyl undecylenate, sulphonated amyl ricinoleate, sulphonated butyl oleate, sulphonated butyl ricinoleate. Of these, the sodium, potassium, or ammonium salts of sulphonated butyl and amyl oleate and ricinoleate are preferred. Examples of substituted ammonium groups are the groups obtained by the reaction of the sulphonated ester with a primary, secondary, or tertiary aliphatic or cycloaliphatic amine containing a maximum of 10 carbon atoms, for example dimethylamine, monoamylamine, morpholine, triethanolamine, 2-methyl 2-amino propanol-1, cyclohexylamine, and the like.

As previously stated, the organic plasticizing ester employed is water-insoluble, or possesses relatively low water-solubility. The organic plasticizer is an ester having a molecular weight of at least 150 obtained by reacting an organic hydroxy compound with a mono- or poly-basic organic acid, or with a poly-basic inorganic acid. The organic hydroxy compound may be a phenol, a monohydric alcohol, a polyhydric alcohol, or an alcohol-ether which may contain more than one hydroxyl group. These hydroxy compounds may be represented by the formula $R(OH)_x$ where R is an alkyl or aryl group and where $x$ is 1 or a multiple thereof up to 6. The term "alkyl group" as used in connection with this formula includes not only the alkyl groups made up of hydrogen and carbon, but also those containing ether linkages. The organic plasticizing ester applicable for use is, therefore, an ester of $R(OH)_x$, as hereinabove defined, and an acid selected from the group consisting of a monobasic organic acid, a polybasic organic acid, and a polybasic inorganic acid, said ester having a molecular weight of at least 150. In case an inorganic acid is used in the preparation of the organic plasticizer, phosphoric acid is preferred.

Of the organic plasticizing esters available for use, a dialkyl ester of a polybasic organic acid, preferably of a dibasic organic acid, for example dibutyl phthalate or dioctyl adipate, may advantageously be employed. Of the compounds formed from inorganic acids, a triaryl phosphate, such as triphenyl or tricresyl phosphate, has been found to be preferable for use. Examples of typical organic plasticizers that may be used in the composition are as follows: dibutyl phthalate, tributyl citrate, dioctyl phthalate, tricresyl phosphate, diethyl sebacate, triamyl phosphate, trimethylene glycol dicaprylate, diethylene glycol monobutyl ether acetate, diglycerol tetraacetate, dibutyl adipate, methyl abietate, triethyleneglycol di-2-ethylbutyrate, dioctyl adipate, triphenyl phosphate, dibutyl tartrate, triethyl citrate, triacetin, butyl acetyl ricinoleate.

The ratio of the amount of the salt of the sulphonated aliphatic monohydric alcohol-fatty acid ester to the amount of the organic plasticizing ester may vary from 1 to 1 by weight up to and including 19 to 1. Generally, the composition will contain from about 60% to 90% of the salt of the sulphonated ester and from 40% to 10% of the organic plasticizing ester, the preferable range in most instances being from 70% to 85% of the salt of the sulphonated ester and from 30% to 15% of the organic plasticizing ester. A mixture of the various salts of the sulphonated esters or of the organic plasticizing esters or of both may be employed in the composition. Diluents such as fatty and mineral oils and solvents may be added to the composition, if desired.

As illustrative of the compositions of the present invention, the following are given:

| | Per cent |
|---|---|
| 1. Sodium salt of sulphonated amyl ricinoleate | 75 |
| Tricresyl phosphate | 25 |
| 2. Potassium salt of sulphonated butyl oleate | 70 |
| Dibutyl phthalate | 30 |
| 3. Ammonium salt of sulphonated butyl ricinoleate | 85 |
| Dioctyl adipate | 15 |

To form the novel silk-soaking bath of the invention, the composition is emulsified in a large volume of water to form a dilute emulsion of the composition in the water. The amount of the composition distributed in the water may vary from .1% to 10% (by weight), but since the smaller the amount of composition used the better from the standpoint of economics, the amount of composition used will usually not exceed 1%. In most instances, in the neighborhood of 1% to 5% of the composition based upon the weight of the silk treated will be used, and generally about 2% will be found to be satisfactory, this amount of composition being from ¼ to 1/16 of the amount of soaking composition required if the usual silk conditioning agents are employed. Preferably in forming the bath, alkalinity is furnished by adding potassium carbonate and sodium bicarbonate in sufficient amounts relative to the bath and to each other to give a pH value of from 8.5 to 9.5, generally in the neighborhood of 9.

The application of the product of this invention is similar to that of ordinary soaking oils. The following is a satisfactory procedure for soaking in a standing bath. Two pounds of a composition such as that of Example 2 above are emulsified in 60 gallons of water, to which may be added appropriate amounts of potassium carbonate and sodium bicarbonate or other mild alkalies as desired, and 100 pounds of raw silk are then immersed in the bath for several hours at about 100° F., during which time, the conditioning agent in the bath is uniformly deposited on the silk. The silk is then thrown in the usual manner and is satisfactorily conditioned for knitting, either wet or dry. Many variations of this method will be apparent to those skilled in the art and the application of the product of this invention is not limited to the above procedure. It can be satisfactorily applied to silk in circulatory soaking machines as well as in a standing bath.

Considerable modification is possible in the salt of the sulphonated ester and in the organic plasticizer selected and in the relative proportions of the two substances in the composition, as well as in the use of the composition as a silk conditioning agent, without departing from the essential features of the invention.

I claim:

1. A silk-soaking composition comprising a mixture of (a) a water-soluble salt of a sulphonated monohydric alcohol-fatty acid ester of the formula $(RCOOR')(-SO_3M)_y$ where R' represents the group furnished by an aliphatic monohydric alcohol containing from 1 to 10 carbons, where R represents the group furnished by an aliphatic unsaturated fatty acid containing from 9 to 17 carbon atoms, there being in the group (RCOOR') a ratio of carbon atoms to ethylenic linkages prior to sulphation of between 12 to 1 and 28 to 1; where M represents a sodium, potassium, ammonium or substituted ammonium ion and where $y$ equals 1 or a fraction thereof greater than ⅕th; and (b) an organic plasticizing ester of a hydroxy compound of the formula $R(OH)_x$ where R is an alkyl or aryl group and where $x$ is 1 or a multiple thereof up to 6 and of an acid selected from the group consisting of a polybasic organic acid and a polybasic inorganic acid, said ester having a molecular weight of at least 150, the ratio of the amount of the salt of the sulphonated aliphatic monohydric alcohol-fatty acid ester to the amount of the organic plasticizing ester being from 1 to 1 by weight to 19 to 1.

2. The silk-soaking composition of claim 1 wherein the composition contains from about 60% to 90% of the water-soluble salt of the sulphonated aliphatic monohydric alcohol-fatty acid ester and from about 40% to 10% of the organic plasticizing ester.

3. The silk-soaking composition of claim 1 wherein the composition contains from about 70% to 85% of the water-soluble salt of the sulphonated aliphatic monohydric alcohol-fatty acid ester and from about 30% to 15% of the organic plasticizing ester.

4. The composition of claim 1 wherein the organic plasticizing agent is a triaryl phosphate.

5. The composition of claim 1 wherein the organic plasticizing agent is a dialkyl ester of a polybasic organic acid.

6. A silk-soaking composition comprising a mixture of (a) a water-soluble salt of a sulphonated ester selected from the group consisting of butyl and amyl oleate and ricinoleate and (b) a triaryl phosphate selected from the group consisting of tricresylphosphate and triphenylphosphate, the composition containing from about 60% to 90% of the water-soluble salt of the sulphonated ester and from about 40% to 10% of the triarylphosphate.

7. The silk-soaking composition of claim 6 wherein the composition contains from about 70% to 55% of the water-soluble salt of the sulphonated ester and from about 30% to 15% of the triaryl phosphate.

8. A silk-soaking composition comprising a mixture of (a) a water-soluble salt of a sulphonated ester selected from the group consisting of butyl and amyl oleate and ricinoleate and (b) a dialkyl ester of a polybasic organic acid having a molecular weight of at least 150, the composition containing from about 60% to 90% of the water-soluble salt of the sulphonated ester and from 40% to 10% of the dialkyl ester of a polybasic organic acid.

9. The silk-soaking composition of claim 8 wherein the composition contains from about 70% to 85% of the water-soluble salt of the sulphonated ester and from about 30% to 15% of the dialkyl ester of a polybasic organic acid.

10. A silk-soaking bath comprising the water emulsion of (a) a water-soluble salt of a sulphonated monohydric alcohol-fatty acid ester of the formula $(RCOOR')(-SO_3M)_y$ where R' represents the group furnished by an aliphatic monohydric alcohol containing from 1 to 10 carbons, where R represents the group furnished by an aliphatic unsaturated fatty acid containing from 9 to 17 carbon atoms, there being in the group $(RCOOR')$ a ratio of carbon atoms to ethylenic linkages prior to sulphation of between 12 to 1 and 28 to 1; where M represents a sodium, potassium, ammonium or substituted ammonium ion and where $y$ equals 1 or a fraction thereof greater than $\frac{1}{5}$th; and (b) an organic plasticizing ester of a hydroxy compound of the formula $R(OH)_x$ where R is an alkyl or aryl group and where $x$ is 1 or a multiple thereof up to 6 and of an acid selected from the group consisting of a polybasic organic acid and a polybasic inorganic acid, said ester having a molecular weight of at least 150, the ratio of the amount of the salt of the sulphonated aliphatic monohydric alcohol-fatty acid ester to the amount of the organic plasticizing ester being from 1 to 1 by weight to 19 to 1, and the amount of composition in said bath being from .1% to 10% of the weight of the bath.

11. The silk-soaking bath of claim 10 wherein the water-soluble salt of the sulphonated aliphatic monohydric alcohol-fatty acid ester is from about 60% to 90% and the organic plasticizing ester is from about 40% to 10% of the total weight of the said salt of said sulphonated ester and the said plasticizing ester present in the bath and wherein the total amount of said salt of said sulphonated ester and the said plasticizing ester in said bath is from .1% to 1% of the weight of the bath.

12. The silk-soaking bath of claim 10 wherein the water-soluble salt of the sulphonated aliphatic monohydric alcohol-fatty acid ester is from about 70% to 85% and the organic plasticizing agent is from about 30% to 15% of the total weight of the said salt of said sulphonated ester and the said plasticizing ester present in the bath, and wherein the total amount of said salt of said sulphonated ester and the said plasticizing ester in said bath is from .1% to 1% of the weight of the bath.

13. The silk-soaking bath of claim 10 wherein the pH value thereof is between 8.5 and 9.5.

14. The silk-soaking bath of claim 10 wherein there is present sufficient potassium carbonate and sodium bicarbonate to give a pH value to the bath of between 8.5 and 9.5.

JAMES T. EATON.